United States Patent [19]
Muir et al.

[11] Patent Number: 6,162,766
[45] Date of Patent: Dec. 19, 2000

[54] ENCAPSULATED BREAKERS, COMPOSITIONS AND METHODS OF USE

[75] Inventors: David J. Muir, Dorchester; Michael J. Irwin, London, both of Canada

[73] Assignee: 3M Innovative Properties Company, St. Paul, Minn.

[21] Appl. No.: 09/087,470

[22] Filed: May 29, 1998

[51] Int. Cl.$^7$ .............................. C09K 7/02; C09K 7/04; B32B 5/16; B32B 15/02
[52] U.S. Cl. .................... 507/267; 507/201; 507/276; 507/921; 507/922; 428/403; 428/404; 428/407
[58] Field of Search .................... 507/201, 267, 507/276, 921, 922; 428/404, 407, 403

[56] References Cited

U.S. PATENT DOCUMENTS

| | | | |
|---|---|---|---|
| 4,329,332 | 5/1982 | Couvreur et al. | 424/9.6 |
| 4,452,861 | 6/1984 | Okamoto et al. | 428/402.24 |
| 4,506,734 | 3/1985 | Nolte | 166/308 |
| 4,741,401 | 5/1988 | Walles et al. | 166/300 |
| 4,919,209 | 4/1990 | King | 166/300 |
| 5,102,558 | 4/1992 | McDougall et al. | 507/129 |
| 5,103,905 | 4/1992 | Brannon et al. | 166/250 |
| 5,164,099 | 11/1992 | Gupta | 507/204 |
| 5,373,901 | 12/1994 | Norman et al. | 166/300 |
| 5,591,700 | 1/1997 | Harns et al. | 507/204 |
| 5,604,186 | 2/1997 | Hunt et al. | 507/204 |

OTHER PUBLICATIONS

Florence, A.T., "Potentially Biodegradable Microcapsules with Poly(alkyl 2–cyanoacrylate) membranes, " *J. Pharm. Pharmacol.*, vol. 31, No. 6, (Jun. 1979) pp. 422–424.
Kante et al. (Int. J. Pharm., 1980, 7, 45.).

*Primary Examiner*—Jill Warden
*Assistant Examiner*—LaToya Cross
*Attorney, Agent, or Firm*—Dale A. Bjorkman

[57] ABSTRACT

An encapsulated breaker is enclosed within a hydrolytically degradable polymer coating. Compositions containing this encapsulated breaker, methods of making and methods of use are also described.

14 Claims, 2 Drawing Sheets

ENCAPSULATED BREAKERS, COMPOSITIONS AND METHODS OF USE

FIELD OF INVENTION

This invention relates to encapsulated breakers. More specifically, this invention relates to breakers that are encapsulated with a hydrolytically degradable material, and compositions and methods for using same.

BACKGROUND OF THE INVENTION

Hydraulic fracturing of subterranean formations is a well known technique for increasing the permeability of such formations in the recovery of materials, such as petroleum products. In this technique, a viscous fluid ("fracturing fluid," commonly an aqueous fracturing fluid, most commonly guar) is introduced to the wellbore, pressure is applied to induce fracture, and proppants in the fluid (most commonly sand) maintain the fractures in an open state. The viscous fluid must then be removed, and oil is harvested from the thus opened subterranean formation. In order to facilitate the quick removal of the fracturing fluid chemicals are used to reduce or "break" the viscosity of the fracturing fluid; these chemicals (most commonly oxidizers, and in particular persulfates) are known as "breakers." The chemical reaction of the breaker with the fracturing fluid is undesirable prior to completion of the fracturing operation. Therefore, it is advantageous to encapsulate or coat the particles with a polymer to delay the release of the breaker, and hence to delay the breaking of the fracturing fluid.

Many materials have been used in the art to encapsulate breakers for fracturing fluids. For example, U.S. Pat. No. 4,506,734 (Nolte) describes a breaker within a crushable glass or ceramic coat that ruptures upon closure of the induced fractures. U.S. Pat. No. 4,741,401 (Walles, et.al.) teaches that a polymer can be applied to a solid breaker chemical, most preferably by air suspension coating. The polymers of Walles are most typically homopolymers and copolymers of polyolefin and ethylene oxides. This patent describes the release of the breaker by rupture of the membrane, either by the force of closure of the fractures within the subterranean formation or by the osmotic pressure of water diffusing into the shell. In U.S. Pat. No. 5,164,099 (Gupta, et.al.), a polymer is applied to a solid particle of a breaker chemical by interfacial polymerization. Typically, this polymer is a polyamide or a crosslinked cellulosic material. This patent states that breaker is released from the capsules described therein by diffusion through the membrane of the encapsulation.

U.S. Pat. No. 5,591,700 (Harris, et.al.) relates to encapsulated breakers that are coated by surfactants that are solid at ambient surface conditions and which dissolve at elevated temperatures in the subterranean formation. The surfactants are mixed in from the dry state.

Alkyl-2-cyanoacrylate monomers polymerize immediately in the presence of a weak base, and as such have been widely used for encapsulation and particle coating in the pharmaceutical industry, primarily for the purpose of drug delivery. For example, Kante et al. (Int. J. Pharm., 1980, 7, 45.) have described a method for preparing actinomycin D nanoparticles using poly(butylcyanoacrylate).

U.S. Pat. No. 4,452,861 (to RCA Corporation) describes a method for coating luminescent, inorganic phosphors using polymeric cyanoacrylates. The procedure outlined involves a five stage process which requires complete evaporation of the nonaqueous solvent during each of the coating stages and a final step which calls for washing of the coated particles.

SUMMARY OF THE INVENTION

An encapsulated breaker is provided for reducing the viscosity of a fracturing fluid. The breaker is enclosed within a hydrolytically degradable polymer coating. Compositions containing this encapsulated breaker and methods of use are also described.

DETAILED DESCRIPTION OF THE INVENTION

Figure 1:
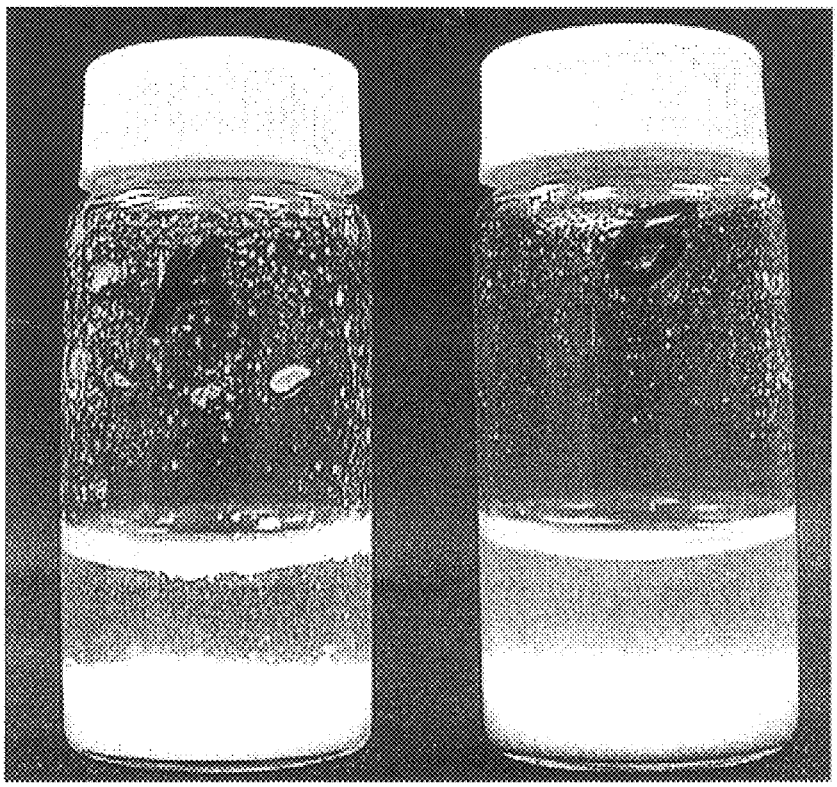
FIG. 1 is a photograph of two vials of encapsulated breaker compositions in water, one vial containing encapsulated breaker of the present invention and the other containing encapsulated breaker coated within a polymer that does not hydrolytically degrade. These vials have not been heated.

The encapsulated breaker of the present invention is enclosed within a hydrolytically degradable polymer coating. By "hydrolytically degrade" is meant that the polymer coating will react with water to chemically break down the polymer coating to predominantly non-solid components in a time and temperature range appropriate for the intended use. Preferably, the coating will hydrolytically degrade within four hours at 70° C. An encapsulated breaker having a coating that hydrolytically degrades is superior to prior art systems, because it allows better control of release time and ease of handling not previously afforded by prior art systems. Because the breaker is encapsulated in a material that reacts with water, rather than simply dissolves or dissipates in water, the release can be controlled through the reaction rate of the coating with water. Because the coating of the present invention partially or completely degrades by reaction with water, the present invention can provide complete delivery of the breaker.

Preferably, the encapsulated breaker of the present invention is relatively stable at ambient temperatures. Thus, the encapsulated breaker does not reduce viscosity lower than 50% at 5 hours at room temperature (20–25° C.) in a Standard Breaking Test. The breaker is, however, released in a controlled manner at a later time in the breaking operation. Thus, preferably the encapsulated breaker does not reduce viscosity lower than 50% at 70° C. at a first predetermined time selected between fifteen minutes and 12 hours. This time period allows the fracturing operation to take place downhole. The encapsulated breaker does reduce viscosity lower than 50% at a second predetermined time period selected between fifteen minutes and 12 hours at 70° C. in a Standard Breaking Test, which occurs after the first predetermined time. Preferably, the first predetermined time is between about 2 and 3 hours and the second predetermined time period is between about 3 and 5 hours. Further, the encapsulated breaker reduces viscosity lower than 50% in a Standard Breaking Test at least 20 minutes after the time that a like composition takes to reduce viscosity below 50% in a Standard Breaking Test where the breaker is not encapsulated. Preferably, the encapsulated breaker reduces viscosity at least 60 minutes later than a like composition with a non-encapsulated breaker.

Surprisingly, the coating for the breaker of the present invention substantially or completely dissipates under conditions of use in the subterranean system. Because no further microcapsule shell is present, or a substantially reduced amount of microcapsule shell is present, clean up of the well and recovery of the petroleum products is substantially eased. Preferably, no more than 50% by weight of the shell remains as a solid component after exposure of the microcapsule to water at 70° C. for four hours. More preferably, no more than 20% of the shell remains, and most preferably, no more than 5% remains as a solid component after exposure of the microcapsule to water at 70° C. for four hours.

Typically, the fracturing fluid is a hydrated polymer such as guar, hydroxyalkylguar, hydroxyalkylcellulose, carboxyalkylhydroxyguar, carboxyalkylhydroxyalkylguar, cellulose or other derivatized cellulose, xanthan and the like in an aqueous fluid to which is added a suitable crosslinking agent. Suitable crosslinking agents include compounds such as borates, zirconates, titanates, pyroantimonates, aluminates and the like.

The polymer shell material of the present invention is primarily a poly(alkyl-2-cyanoacrylate), which is present in an amount sufficient to allow the coating to hydrolytically degrade at temperatures of use above room temperature. Preferably, the poly(alkyl-2-cyanoacrylate) is at least about 50% by weight of the total content of the coating, more preferably at least about 70% and most preferably at least about 90%.

Other materials that may be incorporated into the coating of the present material include comonomers that are copolymerizable with alkyl-2-cyanoacrylate. In particular, comonomers are vinyl reactive monomers, such as those possessing $\alpha,\beta$-unsaturated carbonyl functionalities. Preferably, the comonomers are the esters of acrylic acid and methacrylic acid. A combination of different hydrophobic monomers can be used and may include acrylic or methacrylic esters of non-tertiary alcohols, which have 1 to 14 carbon atoms, preferably from 2 to 12 carbon atoms. It is preferred that the non-tertiary alcohol is an alkanol. Suitable alkanols to form the ester are alkanols such as ethanol, 1-propanol, 2-propanol, 1-butanol, 2-butanol, 1-pentanol, 2-pentanol, 3-pentanol, 2-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, iso-octanol, 2-ethyl-1-hexanol, 1-decanol, 1-dodecanol, 1-tridecanol and 1-tetradecanol. In addition, acrylamides such as t-butylacrylamide, t-octyl acrylamide, and N,N-dimethyl acrylamide can also be utilized. Finally, styrene and derivatives such as p-methoxystyrene can also be employed as comonomers.

The preferred breaker material for aqueous-based fracturing fluids can comprise, for example, enzymes such as hemicellulase, oxidizers such as sodium or ammonium persulfate, organic acids or salts, such as citric acid or a citrate, fumaric acid, liquids adsorbed on a solid substrate, solid perborates, solid peroxides or other oxidizers, mixtures of two or more materials and the like. Most preferably, the breaker material is potassium persulfate. For gelled hydrocarbon fracturing fluids, preferred breakers include calcium oxide, calcium hydroxide, p-nitrobenzoic acid, triethanolamine, sodium acetate, sodium bicarbonate and the like.

Preferably, the coated breakers of the present invention are provided in a slurry with an organic solvent that is compatible with the subterranean system. Providing the coated breaker in a slurry composition offers significant advantages over dry breaker products. Specifically, encapsulated breaker slurries are easier to mix and pump. Additionally, surfactants may be incorporated in the slurry to assist in preventing settling of the slurry.

The coated breaker particles are preferably provided in a solvent that does not facilitate the release of the breaker from its coating. Preferably, the solvent is substantially free of water if the solvent is the reaction medium for preparing the coated particle. Preferred solvents are non-hygroscopic solvents that provide a pumpable slurry under conditions of use. Examples of preferred solvents include mineral oil (such as drill mud oil), vegetable oil, canola oil, siloxanes, hydrofluoroethers, mixtures thereof and the like. Materials are preferably selected such that the material is pumpable even at freezing temperatures. Aliphatic solvents may additionally be used, such as alkanes or aliphatic mixtures including kerosene. Preferably, the solvent is selected such that the overall slurry has a flashpoint over 93° C. for transport safety considerations as measured according to ASTM D 93-90 (the standard test methods for flashpoint by Pensky-Martens, closed tester.) In the case of solvents that have flashpoints that are too low, the effective flashpoint of the slurry composition may be adjusted by mixing solvents. Optionally, the particle may be provided in a dry format that may be mixed at the work site.

Optionally, the encapsulated breaker may be provided in an oily or waxy medium to further control the time for release of the breaker. Access of water to the hydrolytically degradable capsule wall to initiate hydrolytic degradation may be retarded because of the coating of oil or wax. Optionally, the polymer that coats the breaker material may be chemically modified by selection of pendant functionality or surface treatment of the coated breaker, so that the coated breaker has an enhanced affinity to wet out an oily or waxy solvent. This further affinity serves to provide additional short term protection of the coating from contact with water. A mixture of solvents is particularly contemplated in this embodiment, whereby a hydrophobic solvent that will have an affinity to the coated breaker may be provided together with a solvent that is more hydrophilic. The presence of the more hydrophilic solvent will serve to render the slurry more readily mixable with an aqueous fracturing fluid.

The breaker slurry composition may preferably contain a surfactant. Surfactants provide enhanced stability of the slurry and even distribution of the particles suspended in the slurry. Preferred surfactants include oxyalkylated phenolic resin surfactants, resin ester surfactants, polyol surfactants, alkylaryl sulfonate surfactants, polymeric amine surfactants, alcohol ether sulfonates, imidazoline cationic surfactants, complex phosphate esters, amine alkylaryl sulfonates, alkyl amidoamine surfactants, polyamido imidazoline surfactants, fatty imidazoline surfactants, dimer trimer acid surfactants, polyoxyethylated rosin amines, polyoxyethylated rosin amines, polyoxyethylene glycol surfactants, alcohol ether sulfonate surfactants, alcohol ether sulfate surfactants, sulfonate surfactants, sodium alpha olefin sulfonates, sodium alcohol ether sulfates, calcium alkylaryl sulfonates, amine dodecylbenzene sulfonates, fatty acid amides, alkanolamides, and mixtures thereof. Such surfactants are generally known as petroleum surfactants, generally commercially available from Witco Company. Other surfactants include the fluorinated surfactants, such as Fluorad™ surfactants from 3M. Preferably, the surfactant does not additionally contain water that might adversely affect the shelf life stability of the slurry.

Clays may be used in the slurry compositions of present invention, including smectic clays including modified montmorillonites, hectorites, and bentonites.

Proppants additionally may be provided in the slurry composition to assist in holding the fractured subterranean formation open after breaking and removal of the fracturing fluid. Proppants may be selected from any material appropriate for introduction downhole, including sand and sintered bauxite.

Thickeners may additionally be incorporated into the slurry. Preferred thickners include natural extracts such as gum arabic, gum ghatti, khaya gum, agar, pectin, carrageenin and alginates; modified natural extracts; xanthan gums; modified cellulose, such as sodium carboxymethyl cellulose, methyl cellulose, and hydroxyalkylcelluloses; and synthetic polymers such as ultra high molecular carboxy vinyl (carbomers) and acrylic polymers.

The slurry composition comprising the encapsulated breaker may additionally comprise adjuvants suitable for incorporation in breaker compositions, such as colorants, fragrances, preservatives, anti-settling agents, pH controlling buffers, and viscosity modifiers.

The preferred coating of the present invention is produced by suspending the core breaker particles in a non-aqueous liquid containing dissolved alkyl-2-cyanoacrylate monomer. Polymerization of the alkyl-2-cyanoacrylate is effected on addition of a weak base, thereby depositing a coating on the particle surface. The present method provides both a high degree of coating efficiency, as well as excellent ease of processing and isolation of the coated particles. A highly efficient coating process is thereby achieved in a one step procedure with no washing required.

In a preferred reaction of the present invention, potassium persulfate is suspended in a stirred solution of methyl-2-cyanoacrylate or ethyl-2-cyanoacrylate in non-aqueous solvent. As examples of solvents, aliphatic hydrocarbons such as hexane, heptane, and kerosene give excellent results, while aromatic hydrocarbons such as toluene or xylene lead to poor results. Solvents containing a high degree of moisture cannot be used as the water will induce premature polymerization of the cyanoacrylate. After stirring for 5 to 10 minutes to effect thorough mixing, a drop of triethanolamine or other weak base is added to initiate polymerization. Stirring is continued for a further 30 minutes to ensure complete reaction at which time the coated potassium persulfate is collected by filtration and allowed to air dry. A coating efficiency of 93–98% is obtained, as determined by iodometric titration.

Standard Breaking Test

An evaluation of the conditions of release of a breaker at constant temperature is conducted as follows.

A guar gel was prepared by hydrating 25.11 g of gum guar (CAS number 9000-30-0, purchased from the Aldrich Chemical Company) with 2.6 L of water, in a 4 L vessel. On addition of 1.97 g of boric acid (used as received from J. T. Baker Chemicals) the vessel was sealed and placed on rollers to rotate the entire vessel for 12 hours at about 20 revolutions per minute to ensure mixing to a homogeneous fluid. Approximately 480 mL of the borate cross-linked guar fluid (viscosity of ca. 1800 cps) was added to a 500 mL Nalgene container. Subsequently, 0.15 g of the encapsulated breaker (based on potassium persulfate) or as a comparison evaluation an unencapsulated breaker was added and dispersed throughout. The sample was then sealed to prevent water loss and placed into an oven (preheated to 60° C.). Viscosity was monitored at ½ h intervals for the initial 2 h and subsequently 1 h intervals in order to compare viscosity profiles of the unencapsulated vs. encapsulated breaker systems. Viscosity measurements were recorded on a Brookfield Digital Viscometer (Model DV II), spindle #4 at a motor speed of 20 RPM, and are compared to a control sample that has been exposed to the same temperature profile and which is identical in composition except containing no breaker.

The above test does not duplicate conditions downhole, but rather shows lab reproducible data for comparison of effectiveness of the encapsulated breaker with unencapsulated breaker and control compositions. Actual conditions downhole, such as shear and pressure, will result in a breaking profile that provides a higher level of distinction between encapsulated and non-encapsulated breaker. Thus, while the laboratory test would suggest that only a minor benefit is provided by encapsulating the breaker, a much longer benefit is actually observed under conditions of use downhole.

The encapsulated breaker of the present invention is preferably added to the fracturing fluid before the fluid is pumped downhole. In the preferred aspect of the present invention, the encapsulated breaker is extremely stable even in the presence of water at ambient conditions above ground, so the mixing with the fracturing fluid can be taken with due time and care without concern as to premature viscosity breakdown. Preferably, the encapsulated breaker is provided as a slurry, so that it may be easily mixed with the fracturing fluid without the need to resort to solid metering devices. Most preferably, the slurry composition of the present invention is pumped simultaneously with the fracturing fluid downhole using liquid metering devices. Optional liquid mixing equipment to ensure even mixing of the two liquid streams may additionally be utilized.

The following examples are provided for purposes of illustrating the present invention, and are not intended to be limiting of the broadest concepts of the present invention. Unless otherwise indicated, all parts and percentages are by weight.

EXAMPLES

Example 1

Preparation of Dry Encapsulated Breaker

A 500 mL unbaffled polymerization flask was charged with 350 mL of hexane, 40 g of industrial grade potassium persulfate (40–80 mesh) and 10 g ethyl-2-cyanoacrylate. The persulfate salt was dispersed by stirring at 1200 RPM with a 3-blade, marine style propellor. After stirring for about 10 minutes, 0.1 g of triethanolamine was added to the suspension. Stirring continued at room temperature for a further twenty minutes at which time the product was collected by vacuum filtration on a Buchner funnel and air dried under ambient conditions. The dry product is a white, free-flowing powder.

Example 2

Preparation of Encapsulated Breaker Slurry Composition

A 1 L polymerization flask fitted with stainless steel baffles was charged with 300 mL of IPAR 3 drill mud oil and 80 g of industrial grade potassium persulfate (60–100 mesh). Over a period of ca. 20 minutes, 15 g ethyl-2-cyanoacrylate was added to the mixture. The persulfate salt was dispersed by stirring at 1500 RPM with a 6-blade turbine agitator. After stirring for ca. 10 minutes, 0.1 g of triethanolamine was added to the suspension. Stirring continued at room temperature for a further twenty minutes to ensure complete reaction of the cyanoacrylate. With continued stirring, 17 g of "Cab-O-Sil M-5" Silicon Dioxide was added to the mixture in order to provide a stable slurry of the coated persulfate particles.

DETAILED DESCRIPTION OF THE DRAWING

FIG. 1 is a photograph of two vials of encapsulated breaker compositions in water. Vial A contains encapsulated breaker of the invention (Example 1). Vial B contains encapsulated breaker coated within a polymer that does not hydrolytically degrade. These vials have not been heated.

Figure 2:
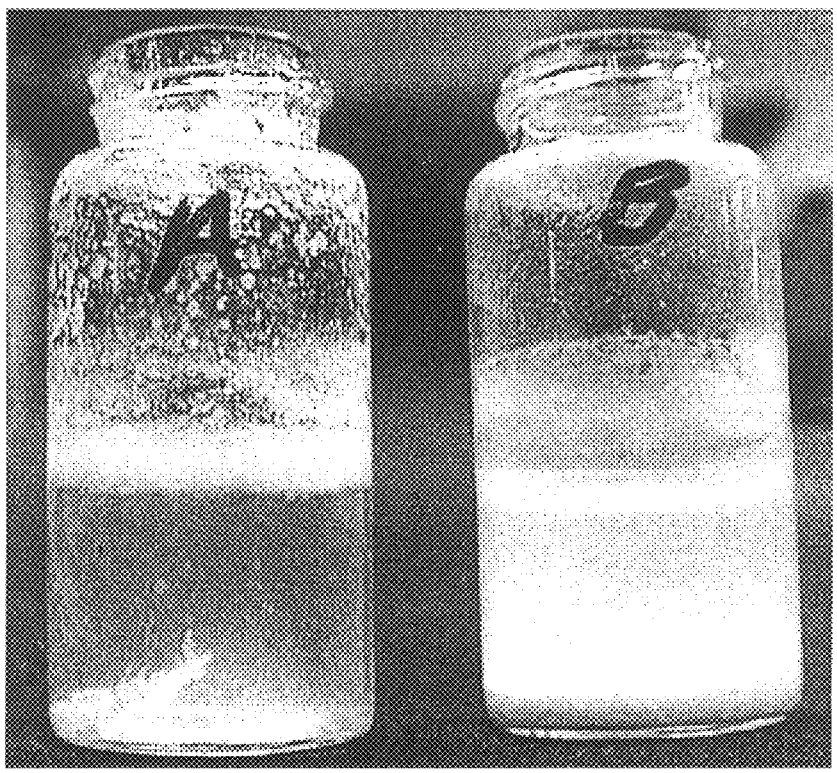
FIG. 2 is a photograph of the vials of FIG. 1 after heating.

FIG. 2 is a photograph of the vials of FIG. 1 after heating to a temperature of 80° C. for 2.5 hours. These photographs demonstrate that the capsule shell of the present invention hydrolytically degrades upon exposure to heat in the presence of water, thereby dissolving the capsule shell wall and reducing the amount of solid material to be recovered from the subterranean formation during the petroleum recovery operation.

Figure 3:
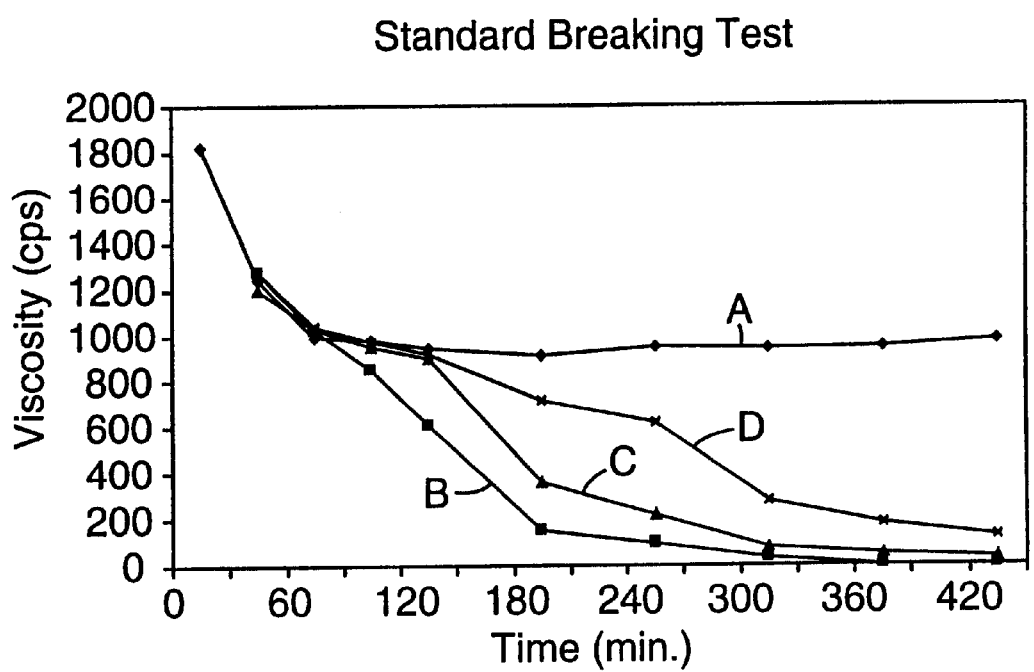
FIG. 3 is a graph showing the viscosity/time profile of guar compositions containing no breaker, unencapsulated breaker and encapsulated breaker.

FIG. 3 is a graphical representation of the Standard Breaking Test, except that the viscosity measurements are carried out at 60° C. Line A represents the time/viscosity profile of a Control sample of crosslinked guar, i.e. containing no breaker. Viscosity is reduced to an essentially stable level after about one hour. Line B represents the time/viscosity profile of a sample of crosslinked guar comprising unencapsulated breaker. This sample exhibits relatively rapid viscosity breakdown, even under laboratory conditions where no pressure or shear forces are present in the manner that would be experienced under actual conditions of use. Line C represents the time/viscosity profile of a sample of crosslinked guar comprising encapsulated breaker that has been mixed into the guar from the dry form (per example 1 above). This sample exhibits a relatively slower viscosity breakdown as compared to the unencapsulated breaker, even under laboratory conditions. Thus, viscosity breakdown is delayed at least 20 minutes as compared to unencapsulated breaker. Line D represents the time/viscosity profile of a sample of crosslinked guar comprising encapsulated breaker that has been mixed into the guar from a slurry (per example 2 above). This sample exhibits an even slower relative viscosity breakdown as compared to the unencapsulated breaker. Thus, viscosity breakdown is delayed at least 60 minutes as compared to unencapsulated breaker.

What is claimed is:

1. An encapsulated breaker comprising a breaker capable of reducing the viscosity of a fracturing fluid, said breaker enclosed within a hydrolytically degradable polymer coating wherein said encapsulated breaker does not reduce viscosity lower than 50% at 5 hours at 25° C. in a Standard Breaking Test, but said encapsulated breaker does not reduce viscosity lower than 50% at 70° C. at a first predetermined time selected between fifteen minutes and 12 hours, but does reduce viscosity lower than 50% at a second predetermined time period selected between fifteen minutes and 12 hours after said first predetermined time at 70° C. in a Standard Breaking Test and wherein said encapsulated breaker reduces viscosity lower than 50% in a Standard Breaking Test at least 20 minutes after a comparison sample which is identical in composition except that the breaker is not encapsulated.

2. The encapsulated breaker of claim 1, wherein said coating is formed from a composition comprising poly(alkyl-2-cyanoacrylate).

3. The encapsulated breaker of claim 2, wherein said coating is formed from a composition additionally comprising one or more comonomers that are copolymerizable with alkyl-2-cyanoacrylate.

4. The encapsulated breaker of claim 3, wherein said comonomers are selected from the esters of acrylic acid and methacrylic acid.

5. The encapsulated breaker of claim 3, wherein said comonomers are selected from the group consisting of acrylic or methacrylic esters of non-tertiary alcohols, which alcohols are selected from the group consisting of ethanol, 1-propanol, 2-propanol, 1-butanol, 2-butanol, 1-pentanol, 2-pentanol, 3-pentanol, 2-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, iso-octanol, 2-ethyl-1-hexanol, 1-decanol, 1-dodecanol, 1-tridecanol and 1-tetradecanol or mixtures thereof.

6. The encapsulated breaker of claim 3, wherein said comonomers are selected from the group consisting of acrylamides and styrenes.

7. The encapsulated breaker of claim 2, wherein said coating is formed from a composition comprising at least about 50% by weight of poly(alkyl-2-cyanoacrylate) based on the total weight of the coating.

8. The encapsulated breaker of claim 2, wherein said coating is formed from a composition comprising at least about 70% by weight of poly(alkyl-2-cyanoacrylate) based on the total weight of the coating.

9. The encapsulated breaker of claim 2, wherein said coating is formed from a composition comprising at least about 90% by weight of poly(alkyl-2-cyanoacrylate) based on the total weight of the coating.

10. The encapsulated breaker of claim 2, wherein the alkyl group of poly(alkyl-2-cyanoacrylate) is C1–20 alkyl.

11. The encapsulated breaker of claim 2, wherein the alkyl group of poly(alkyl-2-cyanoacrylate) is C1–6 alkyl.

12. The encapsulated breaker of claim 1, wherein said breaker comprises a persulfate salt.

13. The encapsulated breaker of claim 12, wherein said persulfate salt is potassium persulfate.

14. An encapsulated breaker comprising a breaker capable of reducing the viscosity of a fracturing fluid, said breaker enclosed within a hydrolytically degradable polymer coating wherein said encapsulated breaker does not reduce viscosity lower than 50% at 5 hours at 25° C. in a Standard Breaking Test, but said encapsulated breaker does not reduce viscosity lower than 50% at 70° C. between 1 and 3 hours from initiation of the Standard Breaking Test, but does reduce viscosity lower than 50% at 70° C. between 3 and 5 hours after initiation of the Standard Breaking Test, and wherein said encapsulated breaker reduces viscosity lower than 50% in a Standard Breaking Test at least 20 minutes after a comparison sample which is identical in composition except that the breaker is not encapsulated.

* * * * *